(12) United States Patent
Ramanathan et al.

(10) Patent No.: US 7,650,384 B2
(45) Date of Patent: Jan. 19, 2010

(54) MAINTAINING REAL-TIME CONVERSATIONS OVER UNRELIABLE CONNECTIONS

(75) Inventors: Rajesh Ramanathan, Redmond, WA (US); Parag Samdadiya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 477 days.

(21) Appl. No.: 11/561,332

(22) Filed: Nov. 17, 2006

(65) Prior Publication Data

US 2008/0120427 A1   May 22, 2008

(51) Int. Cl.
  *G06F 15/16* (2006.01)
(52) U.S. Cl. .................. 709/206; 709/204; 709/230
(58) Field of Classification Search .......... 709/204–207
  See application file for complete search history.

(56) References Cited

U.S. PATENT DOCUMENTS

| 4,787,082 | A  * | 11/1988 | Delaney et al. ............. 370/216 |
| 5,027,269 | A    | 6/1991  | Grant et al. |
| 5,826,039 | A    | 10/1998 | Jones |
| 5,878,351 | A    | 3/1999  | Alanara et al. |
| 6,061,807 | A    | 5/2000  | Albert et al. |
| 6,654,790 | B2   | 11/2003 | Ogle et al. |
| 7,373,144 | B1 * | 5/2008  | Kirkpatrick et al. ......... 455/421 |
| 2003/0110212 | A1 * | 6/2003 | Lewis ........................ 709/203 |
| 2004/0019695 | A1 | 1/2004 | Fellenstein et al. |
| 2004/0066919 | A1 | 4/2004 | Seligmann |
| 2005/0009541 | A1 * | 1/2005 | Ye et al. ...................... 455/466 |
| 2005/0251555 | A1 | 11/2005 | Little |
| 2005/0278425 | A1 * | 12/2005 | Wilsher et al. .............. 709/204 |
| 2006/0095522 | A1 | 5/2006 | Rang et al. |
| 2007/0058637 | A1 * | 3/2007 | Lo ........................... 370/395.2 |

OTHER PUBLICATIONS

"Microsoft Office Communicator 2005 Overview," Microsoft Office Live Communications Server, updated Jun. 1, 2005, © 2006 Microsoft Corporation, [last accessed Aug. 30, 2006].
Maniatis, Petros et al., "The Mobile People Architecture," ACM Mobile Computing and Communications Review, Jul. 1999.
Raman, Bhaskaran, Randy H. Katz and Anthony D. Joseph, "Universal Inbox: Providing Extensible Personal Mobility and Service Mobility in an Integrated Communication Network," 3rd IEEE Workshop on Mobile Computing Systems and Applications 2000, pp. 95-106, © 2000 IEEE.

* cited by examiner

*Primary Examiner*—Daniel Pan
*Assistant Examiner*—Linglan Edwards
(74) *Attorney, Agent, or Firm*—Perkins Coie LLP

(57) ABSTRACT

A method and system for maintaining real-time conversations over unreliable connections is provided. The reliable messaging system initiates a conversation from a sending participant to a receiving participant by sending an invitation to join the conversation to the receiving participant. Once a connection is established, the reliable messaging system associates the conversation with the connection. If the connection is lost, then the reliable messaging system attempts to restore the connection by sending an invitation to the participant that was disconnected. If the reliable messaging system is able to restore the connection, then the new connection is associated with the previous conversation, and the conversation can continue.

16 Claims, 6 Drawing Sheets

MAINTAINING REAL-TIME CONVERSATIONS OVER UNRELIABLE CONNECTIONS

BACKGROUND

Users of computing devices (e.g., laptops, cellular phones, and personal digital assistants) often need to communicate in real time. A common form of real-time communications is provided by instant messaging services. An instant messaging service allows participants at endpoints to send messages and have them received within a second or two by the other participants in a conversation. The receiving participants can then send responsive messages to the other participants in a similar manner. To be effective, a real-time conversation relies on the participants' becoming aware of, reviewing, and responding to received messages very quickly. This quick response is in contrast to conventional electronic mail systems in which the recipients of electronic mail messages respond to messages at their convenience.

To support real-time communications, communications applications typically need to establish and manage connections (also referred to as sessions or dialogs) between computing devices. A session is a set of interactions between computing devices that occurs over a period of time. As an example, real-time communications applications such as MESSENGER or VoIP establish sessions between communicating devices on behalf of users. These applications may use various mechanisms to establish sessions, such as a "Session Initiation Protocol" ("SIP"). SIP is an application-level control protocol that computing devices can use to discover one another and to establish, modify, and terminate sessions between computing devices. SIP is a proposed Internet standard. The SIP specification "RFC 3261" is available at <www.ietf.org/rfc/rfc3261. txt>.

Applications may employ SIP with a lower-level protocol to send or receive messages. SIP may use lower-level connections to transport a dialog's messages, such as Transmission Control Protocol/Internet Protocol ("TCP/IP"), which are commonly employed transport- and network-layer protocols. Transmission Control Protocol ("TCP") is a connection-oriented, reliable-delivery transport-layer protocol. TCP is typically described as a transport layer that provides an interface between an application layer (e.g., an application using SIP) and a network layer. The application layer generally communicates with the TCP layer by sending or receiving a stream of data (e.g., a number of bytes of data). TCP organizes this data stream into segments that can be carried by the protocol employed at the network layer, e.g., the Internet Protocol ("IP"). These segments of data are commonly referred to as "packets," "frames," or "messages." Each message generally comprises a header and payload. The header comprises data necessary for routing and interpreting the message. The payload comprises the actual data that is being sent or received. The application, transport, and network layers, together with other layers, are jointly referred to as a data communications stack.

When an initiating participant wants to start a real-time conversation, that participant needs to know whether the intended participants are available to respond in real time to a message. If not, then communication via conventional electronic mail, voice mail, or some other mechanism may be more appropriate. For example, if the computing devices of the intended participants are currently powered off, then a real-time conversation may not be possible. Moreover, if their computing devices are currently powered on, but the intended participants are away from their computers, a real-time conversation is also not possible. The initiating participant would like to know the availability of the intended participants so that an appropriate decision on the form of communication can be made.

The availability status of an entity such as a computing device (i.e., endpoint) or a user associated with that computing device is referred to as "presence information." Presence information identifies the current "presence state" of the user. Users make their presence information available so that other users can decide how best to communicate with them. For example, the presence information may indicate whether a user is logged on ("online") with an instant messaging server or logged off ("offline"). Presence information may also provide more detailed information about the availability of the user. For example, even though a user is online, that user may be away from their computing device in a meeting. In such a case, the presence state may indicate "online" and "in a meeting."

In an instant messaging context, a publishing user ("publisher") may provide their presence information to a presence server that then provides the presence information to subscribing users ("subscribers"). Thus, a presence server may use a subscriber/publisher model to provide the presence information for the users of the presence service. Whenever the presence information of a user changes, the presence server is notified of the change by that user's computing device, and in turn the presence server notifies the subscribing users of the change. A subscribing user can then decide whether to initiate an instant messaging conversation based on the presence information of the intended participants. For example, if the presence information indicates that a publishing user is currently in a conference telephone call, then the subscribing user may decide to send an instant message, rather than place a telephone call, to the publishing user. If the subscribing user, however, needs to call and speak with the publishing user, the subscribing user needs to monitor the presence information of the publishing user to know when the call can be placed. When the subscribing user notices that the publishing user's presence information indicates that the telephone conference has been concluded, the subscribing user can then place the telephone call. A specification relating to presence information in instant messaging systems, "RFC 2778, " is available at <www.ietf.org/rfc/rfc2778. txt>.

It is not uncommon for participants to be connected over a connection that is intermittently available (i.e., unreliable). For example, a laptop may be connected to a wireless network that fades in and out, or a user may be connected through a home server that is overloaded or is frequently reset. Networking equipment between two connected users may frequently fail and recover. In environments where network connections are unreliable, messages sent by real-time messaging clients often fail to get delivered to the recipient. When a message fails to get delivered, the sending client may display a delivery error message to the user. In many cases, the connection may quickly return, such as when the user is near the edge of reception of a wireless network. If the user's connection frequently disconnects and reconnects, the user may see multiple error messages, contributing to a poor experience for the user. When a participant has multiple endpoints connected to a real-time messaging service (i.e., multiple points of presence or MPOP), such as a laptop, a desktop, and a cell phone, the problem may be even worse. In MPOP scenarios, invitations to join a conversation are often received by the real-time messaging service and forwarded to each of a participant's connected endpoints. Often the most active endpoint will automatically accept the invitation. For example, if a user is having a conversation on a wirelessly connected laptop, and the wireless connection is disconnected, then the user's desktop may accept an invitation from a sending participant to reinitiate the conversation. The sending participant may never notice that he is communicating with a different endpoint, and the receiving user may never see the messages if she is not near her desktop.

SUMMARY

A method and system for maintaining real-time conversations over unreliable connections is provided. The reliable messaging system initiates a conversation from a sending participant to a receiving participant by sending an invitation to join the conversation to the receiving participant. Once a connection is established, the reliable messaging system associates the conversation with the connection. The sending and receiving participants can then send messages back and forth over the new connection. If at some point the connection is lost, such as when one participant moves out of range of a wireless connection, then the reliable messaging system attempts to restore the connection by sending an invitation to the participant that was disconnected. If the participant that was disconnected has multiple connected endpoints, then the reliable messaging system may first attempt to restore the connection to the same endpoint that was previously connected. If the reliable messaging system is able to restore the connection, then the new connection is associated with the previous conversation, and the conversation can continue.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
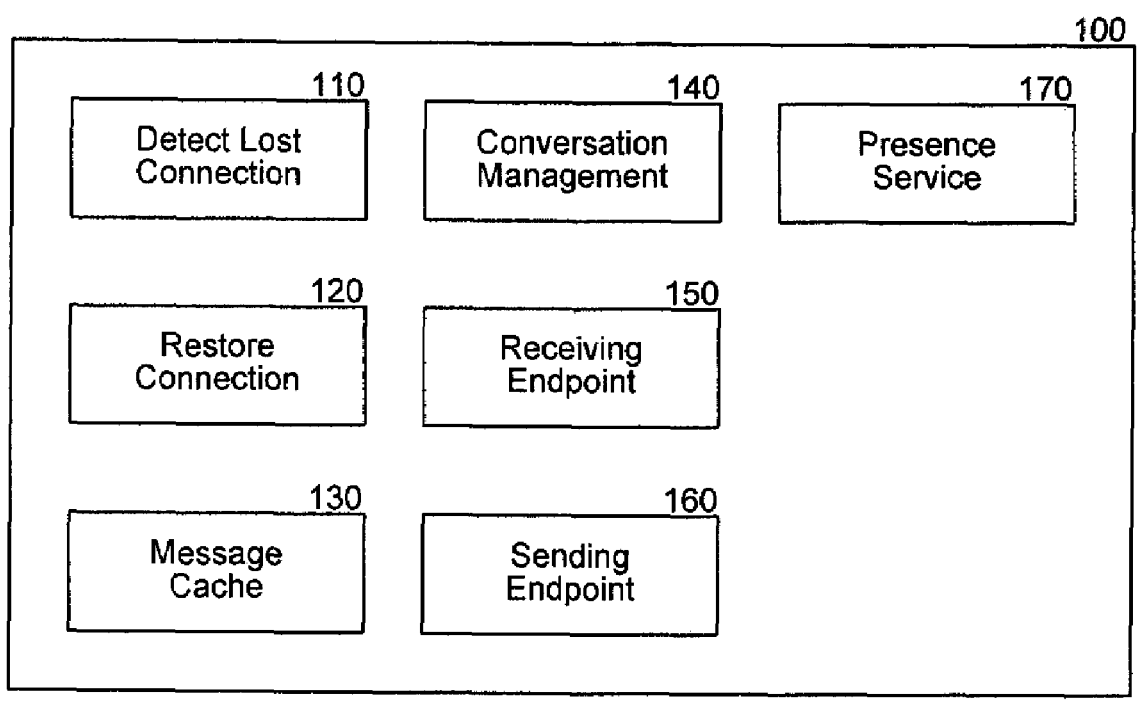
FIG. 1 is a block diagram that illustrates components of the system, in one embodiment.

A method and system for maintaining real-time conversations over unreliable connections is provided. The reliable messaging system initiates a conversation from a sending participant to a receiving participant by sending an invitation to join the conversation to the receiving participant. The invitation may be sent to a central service that forwards the invitation to each of the receiving participant's connected endpoints, or the invitation may be sent directly to each of the receiving participant's connected endpoints using presence information that specifies the addresses of each. Once a connection is established, the reliable messaging system associates the conversation with the connection. The reliable messaging system may open a conversation window in a user interface displayed to each participant. The sending and receiving participants can then send messages back and forth over the new connection by typing messages in the conversation window. If at some point the connection is lost, such as when one participant moves out of range of a wireless connection, then the reliable messaging system attempts to restore the connection by sending an invitation to the participant that was disconnected. If the participant that was disconnected has multiple connected endpoints, then the reliable messaging system may first attempt to restore the connection to the same endpoint that was previously connected. The reliable messaging system may delay displaying any error message to the user for a certain amount of time while the reliable messaging system attempts to restore the connection. If the reliable messaging system is able to restore the connection, then the new connection is associated with the previous conversation, and the conversation can continue. In this way, real-time communication appears more reliable to the user, because the user will see fewer delivery errors when a connection can be reestablished. When a receiving participant is connected using MPOP, the sending participant will connect to the same endpoint more often, and be able to continue the conversation uninterrupted.

In some embodiments, the reliable messaging system caches any messages sent while the connection is unavailable. For example, the sending participant may continue to type messages to the receiving participant while the reliable messaging system is attempting to restore the connection. If the messages are not cached, they may be lost. However, by caching the messages, the reliable messaging system can send the messages to the receiving participant once the connection is restored.

In some embodiments, the reliable messaging system assigns an identifier to each message. For example, the reliable messaging system may assign a monotonically increasing identifier to each message sent by one of the participants. When the connection is lost and restored, the receiving participant can use the identifier to detect messages that the receiving participant missed. The reliable messaging system can use this information to display an indication to the receiving participant and/or sending participant to indicate that some messages were lost. The reliable messaging system can also use this information to request the missed messages from the sending participant if the sending participant is caching messages.

In some embodiments, the reliable messaging system informs the sending participant when the connection cannot be reestablished with the same endpoint. For example, the receiving participant may be connected through a laptop whose battery dies, and the conversation may be reconnected through the receiving participant's desktop. When this happens, the reliable messaging system may display an informational message to the sending participant to indicate that the conversation is continuing through a new endpoint. This information will allow the sending participant to understand why no reply is being received to messages if the receiving participant is not near her desktop, or to explain any delay if it takes the receiving participant extra time to move from the failed laptop to her desktop.

In some embodiments, the reliable messaging system displays an indicator in the sending participant's user interface while delivery of a message is being attempted. For example, when using SIP, messages are acknowledged by the receiving participant's endpoint by sending a "200 OK" response. If the receiving participant is disconnected, the sending participant may receive other responses, such as "480 Temporarily Unavailable" or "504 Server Timeout," that prompt the sending participant's endpoint to attempt to reconnect to the receiving participant. During this time, the reliable messaging system may display an hourglass or other indicator next to any messages sent to indicate that the endpoint is still attempting delivery of those messages. This gives the sending participant feedback to know, for example, that the receiving participant may not immediately respond and that the sending participant may want to delay sending additional messages until the previous messages are delivered.

In some embodiments, the reliable messaging system may send an endpoint identifier in the invitation to join a conversation. For example, when a sending participant sends an invitation to a receiving participant, the sending participant may include an identifier that distinguishes the endpoint from which the invitation is sent from other endpoints of the sending participant. Likewise, the receiving participant may include an identifier in the invitation acceptance that indicates which of multiple endpoints associated with the receiving participant accepted the invitation. If the connection is later lost, then either the endpoint of the sending participant or the receiving participant can attempt to restore the connection to the same endpoint to which it was previously connected.

In some embodiments, the reliable messaging system uses a timeout to determine how long to attempt to restore a connection. For example, when a message is not delivered, the reliable messaging system may attempt to restore the connection to the receiving participant's endpoint for a certain amount of time (e.g., 30 seconds). The amount of time may be fixed or it may be dynamically determined, such as by measuring previous amounts of time required to restore the connection. If a connection to the same endpoint cannot be made before the timeout expires, then the reliable messaging system may attempt to connect to other endpoints of the receiving participant for a certain amount of time.

In some embodiments, the reliable messaging system resolves ties between the endpoints of a sending and receiving participant each attempting to reestablish a connection at the same time. For example, when the connection is lost, both the sending and receiving participants' endpoints may attempt to restore the connection. When the connection returns, such as when the user returns within range of a wireless network, both the sending and receiving participants' endpoints may form a new connection. Rather than use both connections, the reliable messaging system may choose one connection to win the tie created by both endpoints establishing a separate connection. The tie may be broken by several mechanisms. For example, the reliable messaging system may assign each endpoint an identifier, and may break the tie by using the connection from the endpoint having the highest identifier.

In some embodiments, when a connection is lost to one endpoint, the reliable messaging system forms a connection with another available endpoint and replaces the connection when a connection with the first endpoint can be reestablished. For example, if a receiving participant is connected using a laptop and the connection is lost, then the reliable messaging system may connect the sending participant with the receiving participant's desktop. Later, when the connection with the laptop is available again, the reliable messaging system may connect the sending participant with the receiving participant's laptop, and associate the connection with the conversation such that the connection with, the laptop replaces the connection with the desktop. In this way, the conversation continues uninterrupted but the connection with the laptop is preferred when it is available.

FIG. 1 is a block diagram that illustrates components of the system, in one embodiment. The reliable messaging system 100 contains a detect lost connection component 110, a restore connection component 120, a message cache component 130, a conversation management component 140, at least one receiving endpoint 150, at least one sending endpoint 160, and a presence service 170. The detect lost connection component 110 detects when a connection between two endpoints is lost, such as when a network component fails or one of the endpoints is reset. The restore connection component 120 attempts to restore connections between endpoints that are lost, such as by retrying the connection or by selecting an alternative endpoint to which to connect. The message cache component 130 stores messages sent while a connection is being restored. The message cache component 130 may resend the messages after the connection is restored. The conversation management component 140 manages a conversation between a sending participant and a receiving participant across various connections. For example, a conversation may start out on an initial connection that is lost and continue on a new connection. The receiving endpoint 150 represents one or more endpoints connected to the reliable messaging system 100 that participate in real-time conversations. The sending endpoint 160 represents one or more endpoints that connect to the receiving endpoint 150 to participate in real-time conversations. The presence service 170 maintains presence information about each of the endpoints and users that connect to the reliable messaging system 100.

The computing device on which the system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
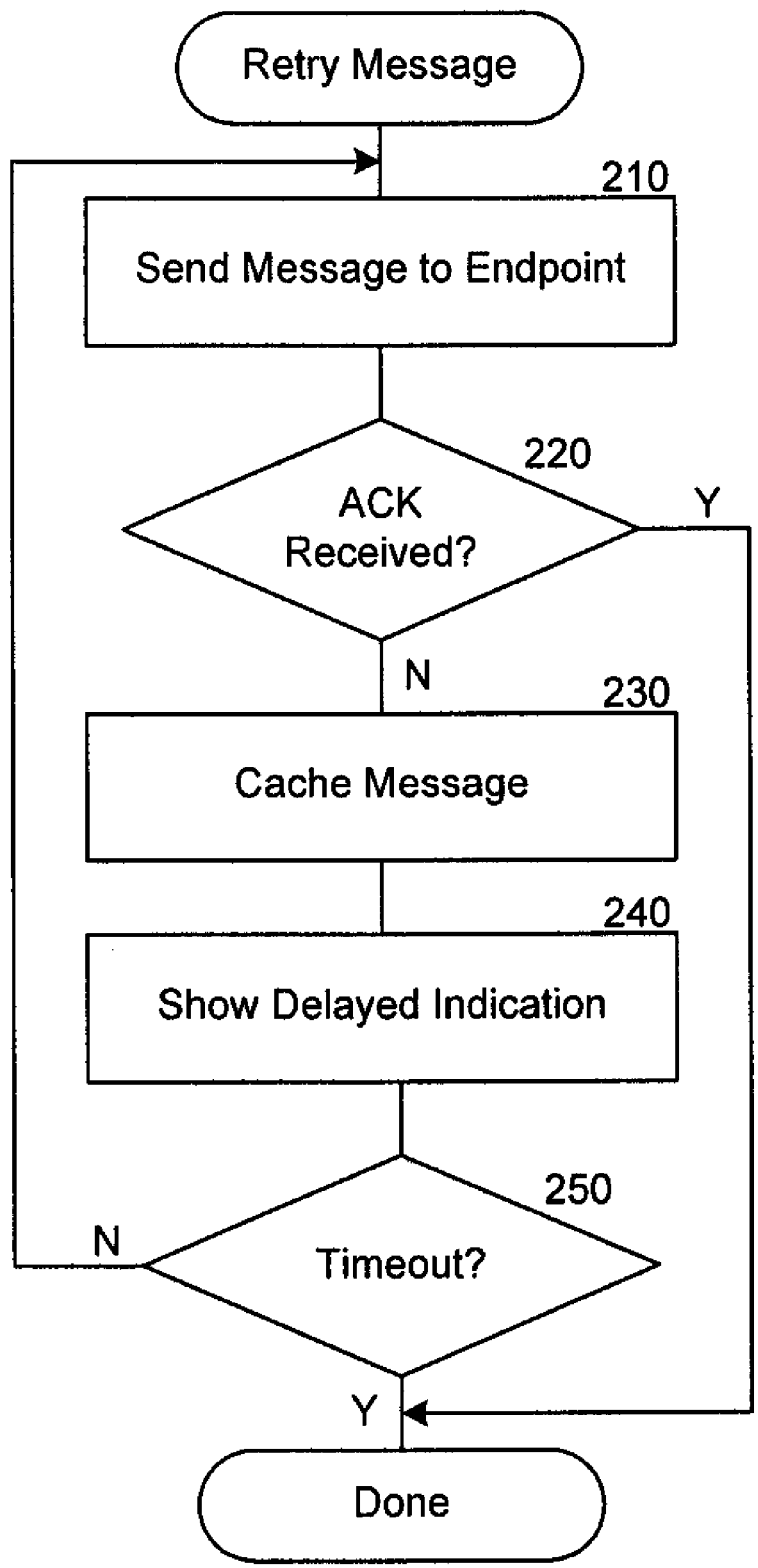
FIG. 2 is a flow diagram that illustrates the processing of the conversation management component of the system, in one embodiment.

FIG. 2 is a flow diagram that illustrates the processing of the conversation management component of the system, in one embodiment. The component is invoked when a sending participant sends a message to a receiving participant. In block 210, the component sends the message to the receiving participant's endpoint. In decision block 220, if an acknowledgment is received from the receiving participant, then the component completes, else the component continues at block 230. In block 230, the component caches the message so that it can be resent once the connection is working again. In block 240, the component may optionally display an indication to the sending participant that the delivery of the message has been delayed. In decision block 250, if a timeout expires while attempting to deliver the message, then the component completes, else the component loops to block 210 to attempt to retry sending the message.

Figure 3:
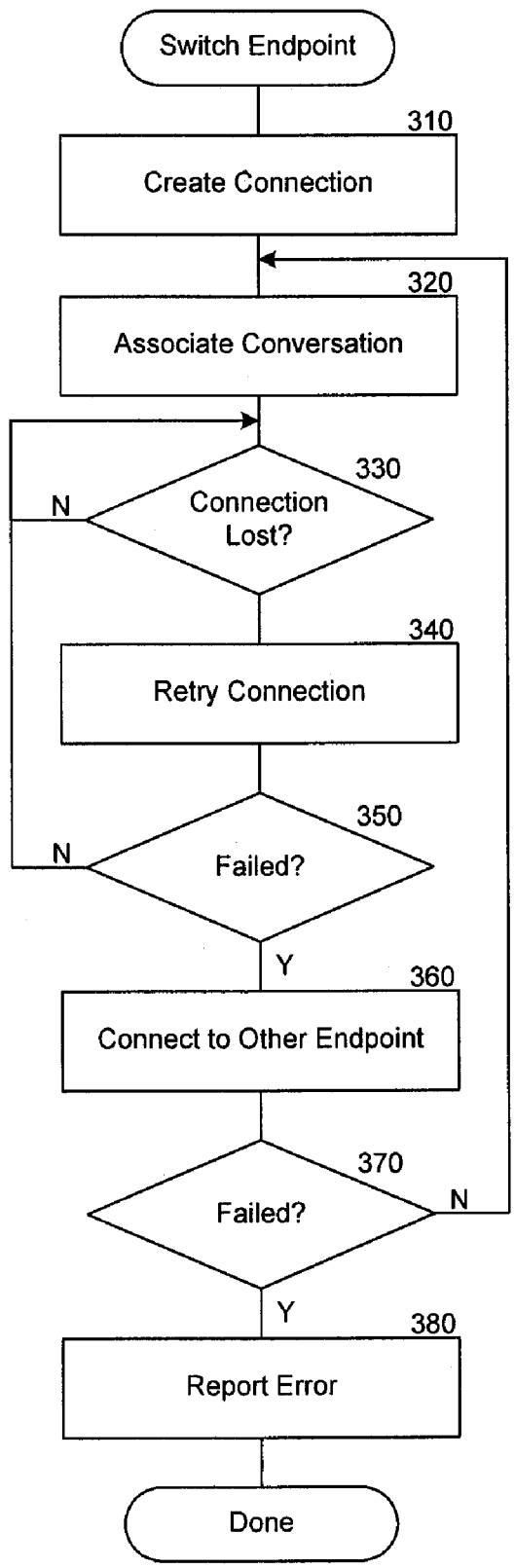
FIG. 3 is a flow diagram that illustrates the processing of the conversation management component of the system, in one embodiment.

FIG. 3 is a flow diagram that illustrates the processing of the conversation management component of the system, in one embodiment. The component is invoked when a receiving participant is connected to the reliable messaging system through multiple endpoints. In block 310, the component creates a connection from a sending participant to one of the receiving participant's endpoints. In block 320, the component associates a conversation between the sending participant and receiving participant with the connection. In decision block 330, if the connection is lost, then the component continues at block 340, else the component loops to block 330. In block 340, the component attempts to restore the connection to the same endpoint of the receiving participant. In decision block 350, if the component succeeds in restoring the connection, then the component loops to block 330, else the component continues at block 360. In block 360, the component attempts to connect to another of the receiving participant's endpoints. In decision block 370, if the component succeeds in connecting to another of the receiving participant's endpoints, then the component loops to block 320 to associate the conversation with the new endpoint, else the component continues at block 380. In block 380, the component reports an error to the user indicating that a connection could not be established to any of the receiving participant's endpoints and the conversation cannot continue. The component then completes.

Figure 4:
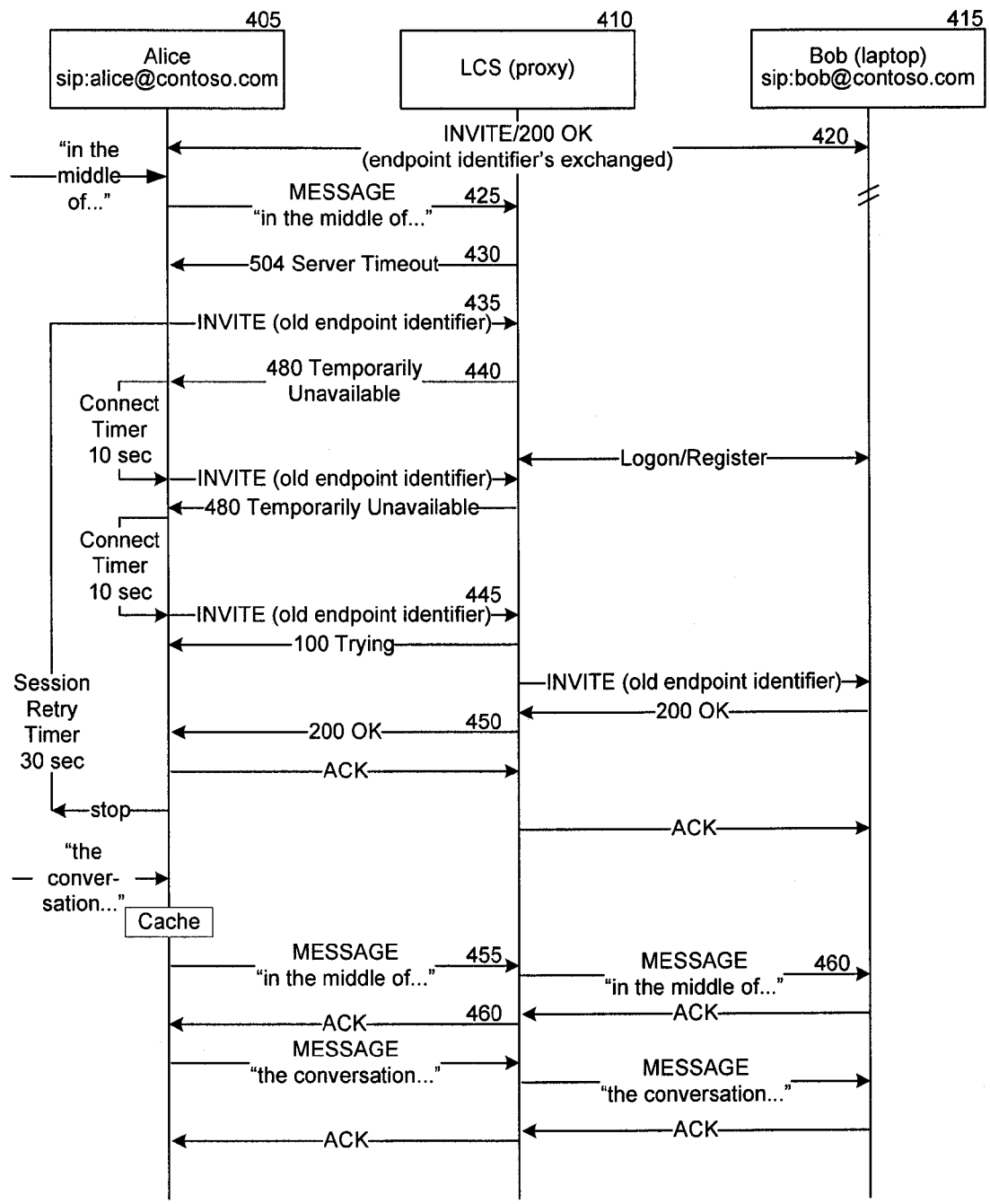
FIG. 4 is a network diagram illustrating packets sent by the reliable messaging system to restore a connection, in one embodiment.

FIG. 4 is a network diagram illustrating packets sent by the reliable messaging system to restore a connection, in one embodiment. A sending endpoint 405 associated with a user Alice is connected through a proxy server LCS 410 to a receiving endpoint 415 associated with a user Bob. Alice's endpoint 405 sends an invitation and receives an acknowledgment 420 that establishes the conversation and initial connection. Alice's endpoint 405 sends a message 425 to the proxy server LCS 410 that does not get delivered. The proxy server LCS 410 sends a "504 Server Timeout" reply 430 to Alice's endpoint 405. Alice's endpoint 405 begins trying to restore the connection by sending a new INVITE 435 that specifies the recipient's endpoint identifier. The proxy server LCS 410 responds that the endpoint is unavailable by returning a "480 Temporarily Unavailable" response 440. Later, Alice's endpoint 405 sends an INVITE 445 that is received by Bob's now reconnected endpoint 415. Alice's endpoint 405 receives an acknowledgment 450 that indicates that the connection has been reestablished. Alice's endpoint 405 then continues the conversation by sending a message 455 that is forwarded 460 by the proxy server LCS 410 to Bob's endpoint 415. Alice's endpoint 405 receives an acknowledgment 465 that the message was successfully delivered.

Figure 5:
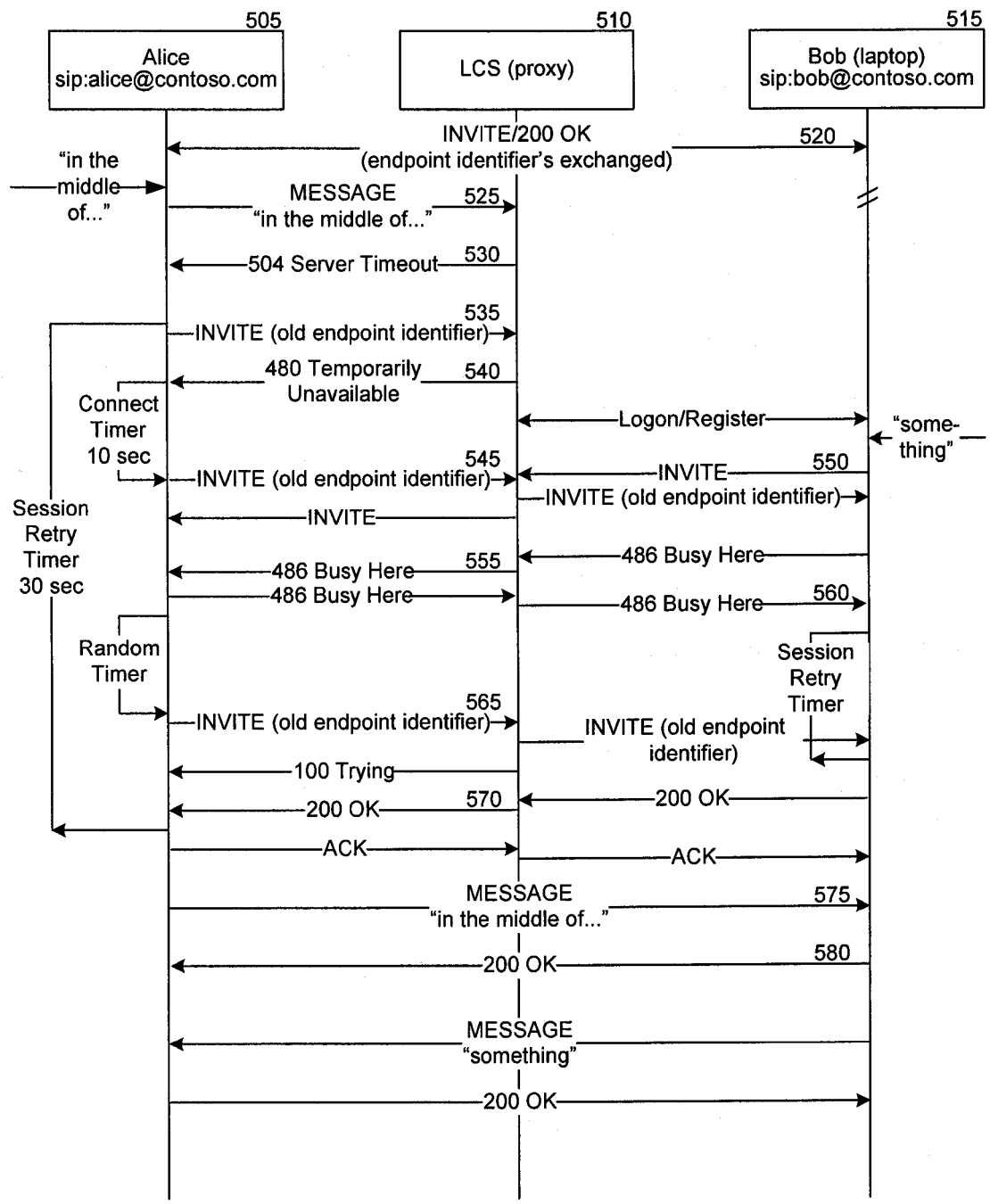
FIG. 5 is a network diagram illustrating packets sent by the reliable messaging system when both endpoints attempt to restore the connection, in one embodiment.

FIG. 5 is a network diagram illustrating packets sent by the reliable messaging system when both endpoints attempt to restore the connection, in one embodiment. A sending endpoint 505 associated with a user Alice is connected through a proxy server LCS 510 to a receiving endpoint 515 associated with a user Bob. Alice's endpoint 505 sends an invitation and receives an acknowledgment 520 that establishes the conversation and initial connection. Alice's endpoint 505 sends a message 525 to the proxy server LCS 510 that does not get delivered. The proxy server LCS 510 sends a "504 Server Timeout" reply 530 to Alice's endpoint 505. Alice's endpoint 505 begins trying to restore the connection by sending a new INVITE 535 that specifies the recipient's endpoint identifier. The proxy server LCS 510 responds that the endpoint is unavailable by returning a "480 Temporarily Unavailable" response 540. Later, Alice's endpoint 505 sends an INVITE 545 at the same time that Bob's endpoint 515 sends an INVITE 550. Alice's endpoint 505 receives a reply 555 "486 Busy Here" that indicates that Bob's endpoint 515 is also attempting to restore the connection. Bob's endpoint 515 also receives a reply 560 "486 Busy Here" that indicates that Alice's endpoint 505 is attempting to restore the connection. The two endpoints break the tie, such as by determining which endpoint has a higher identifier, and determine that Alice's endpoint 505 should restore the connection. Alice's endpoint 505 then sends another INVITE 565 that is successful, and receives an acknowledgment 570. Alice's endpoint 505 then continues the conversation by sending a message 575. Alice's endpoint 505 receives an acknowledgment 580 that the message was successfully delivered.

Figure 6:
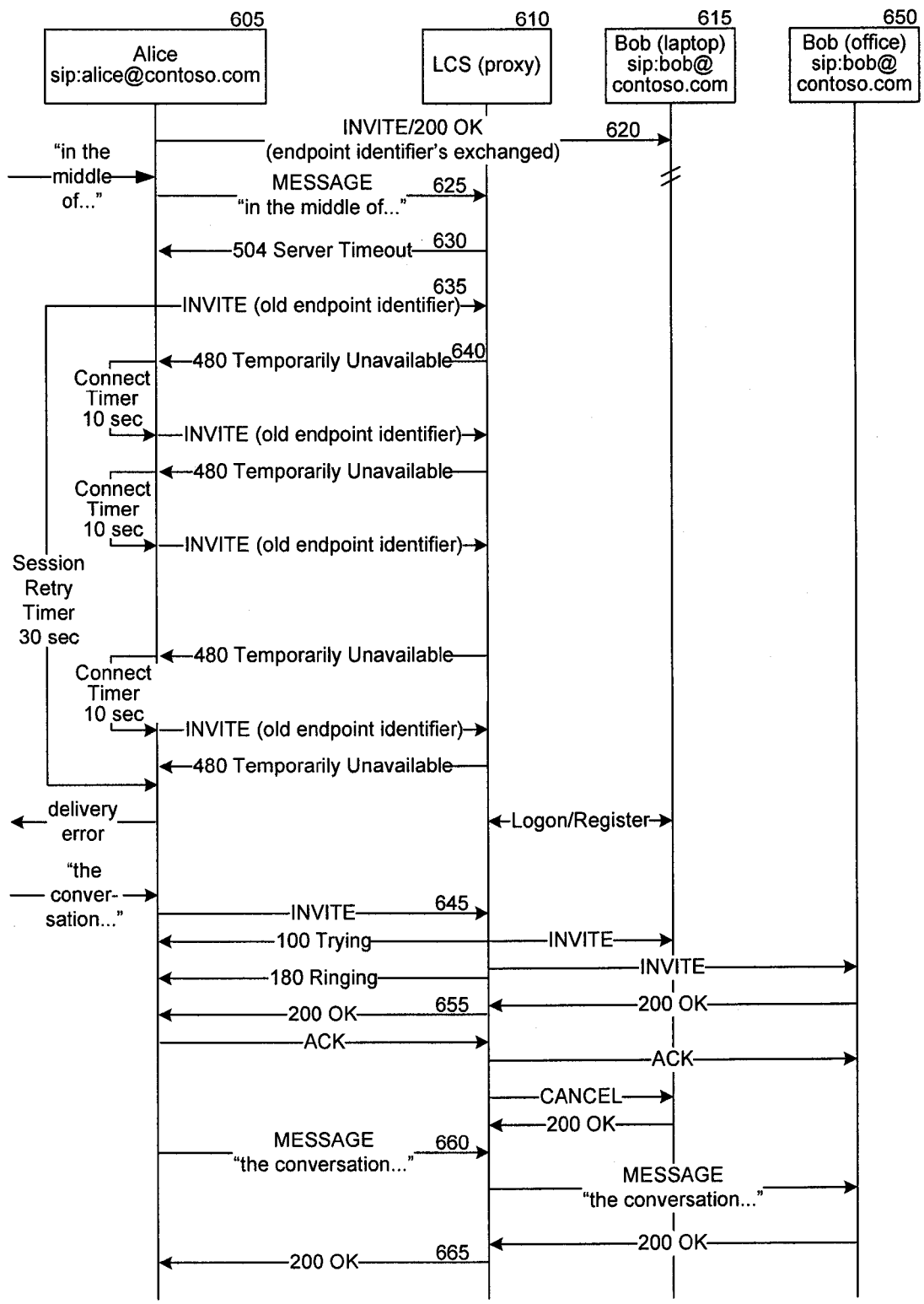
FIG. 6 is a network diagram illustrating packets sent by the reliable messaging system to restore a connection, in one embodiment.

FIG. 6 is a network diagram illustrating packets sent by the reliable messaging system to restore a connection, in one embodiment. A sending endpoint 605 associated with a user Alice is connected through a proxy server LCS 610 to a receiving endpoint 615 associated with the laptop of a user Bob. Alice's endpoint 605 sends an invitation and receives an acknowledgment 620 that establishes the conversation and initial connection. Alice's endpoint 605 sends a message 625 to the proxy server LCS 610 that does not get delivered. The proxy server LCS 610 sends a "504 Server Timeout" reply 630 to Alice's endpoint 605. Alice's endpoint 605 begins trying to restore the connection by sending a new INVITE 635 that specifies the recipient's endpoint identifier. The proxy server LCS 610 responds that the endpoint is unavailable by returning a "480 Temporarily Unavailable" response 640. Alice's endpoint 605 continues attempting to restore the connection to Bob's endpoint 615 until a timeout expires. Then, Alice's endpoint 605 attempts to connect to another of Bob's endpoints by sending an INVITE 645 that is received by Bob's desktop endpoint 650. Alice's endpoint 605 receives an acknowledgment 655 that indicates that the connection has been reestablished. Alice's endpoint 605 then continues the conversation by sending a message 660 that is received by Bob's desktop endpoint 650. Alice's endpoint 605 receives an acknowledgment 665 that the message was successfully delivered.

From the foregoing, it will be appreciated that specific embodiments of the reliable messaging system have been described herein for purposes of illustration, but that various modifications may be made without deviating from the spirit and scope of the invention. For example, although typed text messages have been described, other modes of communication are compatible with the system such as video chat, audio chat, VoIP, and text with graphics. Although instant messaging has been used as an example, other forms of real-time communication, such as VoIP telephone calls, can also be used. Accordingly, the invention is not limited except as by the appended claims.

We claim:

1. A method in a computing device for maintaining a real-time conversation over an unreliable connection, the method comprising:

creating a first connection from an endpoint associated with a sending participant to an endpoint associated with a receiving participant, the first connection being created using a Session Initiation Protocol ("SIP") by sending a SIP invitation from the endpoint associated with the sending participant to a plurality of endpoints associated with the receiving participant; and receiving a SIP response sent from an endpoint associated with the receiving participant to the endpoint associated with the sending participant, the SIP response identifying the endpoint of the receiving participant that sent the response;

associating the real-time conversation with the first connection;

conducting the real-time conversation by sending messages of the real-time conversation from the endpoint associated with the sending participant to the endpoint identified in the received SIP response; and receiving messages of the real-time conversation sent from the endpoint identified in the received SIP response to the endpoint associated with the sending participant;

detecting that the first connection has been lost;

upon detecting that the first connection has been lost, creating a second connection from an endpoint associated with the sending participant to an endpoint associated with the receiving participant without notifying the sending participant;

when the second connection is created through an endpoint other than the endpoint identified in the received SIP response, notifying the sending participant that the real-time conversation is continuing through a different endpoint associated with the receiving participant; and associating the real-time conversation with the second connection.

2. The method of claim 1 further comprising, upon detecting that the first connection has been lost, caching messages until the connection is restored.

3. The method of claim 1 wherein creating a second connection comprises attempting to connect to the same endpoint of the receiving participant as the first connection.

4. The method of claim 1 wherein creating a second connection comprises, when a connection to the same endpoint of the receiving participant as the first connection cannot be established before a timeout expires, attempting to connect to another endpoint associated with the receiving participant.

5. The method of claim 1 wherein the conversation is associated with a conversation window in a user interface displayed to the sending participant and the receiving participant and wherein the same conversation window is used to continue the conversation after the second connection is established.

6. The method of claim 1 further comprising displaying a delivery status indication in association with a message displayed in a conversation window.

7. The method of claim 1 further comprising assigning an identifier to each message sent as part of the conversation.

8. The method of claim 1 wherein creating a first connection comprises exchanging identifiers that identify the endpoint associated with the sending participant and the endpoint associated with the receiving participant.

9. A computer-readable medium encoded with instructions for controlling a computing device of a first user to restore a connection to an identified endpoint associated with a second user, by a method comprising:

sending a Session Initiation Protocol ("SIP") invitation to join a conversation to each of multiple endpoints associated with the second user;

receiving an indication of an identified endpoint associated with the second user that accepted the invitation to establish a connection between the computing device and the identified endpoint;

conducting through the established connection the conversation between the computing device and the identified endpoint;

detecting that the established connection with the identified endpoint has been lost; and after detecting that the established connection has been lost, sending a SIP invitation to the identified endpoint to restore the connection and continue the conversation;

when the connection cannot be restored with the identified endpoint, sending a SIP invitation to an endpoint associated with the second user other than the identified endpoint; and when the connection is restored with an endpoint associated with the second user other than the identified endpoint, notifying the first user that the conversation is continuing through a different endpoint associated with the second user wherein the first user is not notified when the connection is restored with the identified endpoint.

10. The computer-readable medium of claim 9 wherein the SIP invitation contains an identifier identifying the computing device of the first user.

11. The computer-readable medium of claim 9 wherein receiving an indication of an identified endpoint associated with the second user that accepted the invitation comprises receiving an endpoint identifier in an acknowledgment to the SIP invitation.

12. The computer-readable medium of claim 9 wherein detecting that the connection with the identified endpoint has been lost comprises receiving an error response from a proxy server.

13. The computer-readable medium of claim 9 further comprising, upon detecting that the connection with the identified endpoint has been lost, caching messages sent to the second user until the connection is restored.

14. The computer-readable medium of claim 9 further comprising, when two endpoints attempt to restore the connection at the same time, selecting one of the endpoints to continue attempting to restore the connection.

15. A computer system for maintaining an instant messaging conversation using an unreliable connection medium, comprising:

a memory storing computer-executable instructions of a create connection component configured to establish a connection between a first endpoint of a first user and a second endpoint of a second user using a Session Initiation Protocol;

a conversation management component configured to manage a conversation between a first user and a second user across an established connection between the first endpoint and the second endpoint;

a detect lost connection component configured to detect the loss of a connection over which the conversation is being conducted;

a restore connection component configured to restore a lost connection such that when the connection cannot be restored with the second endpoint, creating a connection between the first endpoint and a third endpoint of the second user to restore the connection over which the conversation is being conducted and notifying the first user when the connection is established with the third endpoint, but not when the connection is restored with the second endpoint; and a message cache component configured to cache messages while the connection is being restored and to send the cached messages when the connection is restored; and a processor for executing the computer-executable instructions store in the memory.

16. The system of claim 15 wherein the conversation management component invokes the restore connection component to restore the connection to an endpoint that was previously connected.

* * * * *

UNITED STATES PATENT AND TRADEMARK OFFICE
CERTIFICATE OF CORRECTION

PATENT NO. : 7,650,384 B2  Page 1 of 1
APPLICATION NO. : 11/561332
DATED : January 19, 2010
INVENTOR(S) : Ramanathan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this

Twenty-third Day of November, 2010

David J. Kappos
*Director of the United States Patent and Trademark Office*